Patented Apr. 10, 1934

1,953,956

UNITED STATES PATENT OFFICE 1,953,956

MANUFACTURE OF MATERIALS HAVING A BASIS OF CELLULOSE DERIVATIVES

Henry Dreyfus, London, England

No Drawing. Application March 26, 1931, Serial No. 525,618. In Great Britain May 20, 1930

15 Claims. (Cl. 106—40)

This invention relates to the manufacture of plastic and celluloid-like masses, moulding powders and the like having a basis of cellulose acetate or other cellulose esters or ethers and to the manufacture of articles therefrom.

In the manufacture of such materials the plasticizing agent is usually incorporated with the aid of relatively large quantities of volatile solvent or non-solvent for the cellulose derivative, for example proportions of the order of 100 to 200% on the weight of the cellulose derivative. Cellulose acetate for example is kneaded with a solution of the plasticizer in benzene-alcohol or in alcohol alone and the whole worked up into a plastic mass with or without subsequent evaporation of part of the solvent. When the plastic mass thus obtained is worked up into the desired articles, a process known as seasoning is required to eliminate the volatile liquids, since if these liquids are not eliminated the sheets or other articles formed from the plastic mass are liable to warping.

I have now found that it is unnecessary in order to obtain a homogeneous incorporation of the plasticizing agents to apply the plasticizer in conjunction with a volatile solvent or diluent, and according to the present invention the plasticizing agent is worked into the cellulose derivative in the absence or in the substantial absence of volatile solvents or diluents. By this means the seasoning period referred to above may be entirely avoided.

The plasticizing agent may be incorporated in the cellulose derivative in any desired proportion in accordance with the qualities, and particularly the hardness, of the product required, for example in proportions of 10, 20, 30 or 50% or more on the weight of the cellulose derivative. It will be seen that with these proportions of plasticizing agent it is impracticable in order to obtain the desired homogeneous product to treat the solid cellulose acetate or other cellulose derivative directly with the plasticizing agent alone in liquid form, since if such a method be adopted the plasticizing agent cannot be uniformly distributed over the whole of the cellulose derivative. In the present invention the plasticizer is applied in the form of a spray or in any other form in which the finely divided plasticizer is applied uniformly or substantially uniformly over the cellulose derivative in the absence or substantial absence of volatile solvents or diluents. For this method of application liquid plasticizing agents should be employed. The plasticizer employed may be a single substance which is itself liquid at ordinary temperatures or at the temperature of application, or it may be constituted by a mixture of plasticizing agents or a mixture of plasticizing agent with other bodies which it is desired to incorporate and which mixtures are liquid or sprayable at ordinary temperatures or at a temperature suitable for working. As suitable plasticizers I may mention para-toluene sulphonamide and the isomeric xylene low carbon alkyl sulphonamides and particularly the isomeric xylene N-methyl sulphonamides, tri-cresyl phosphate, and diethyl tartrate and alkyl phthalates, e. g. dimethyl and diethyl phthalates, which are liquid at atmospheric temperature.

As a further alternative to employing the plasticizer alone or simply in admixture with other substances to be incorporated in the cellulose derivative, the plasticizer may be sprayed on to the cellulose derivative in the form of a solution in a volatile solvent and preferably a highly volatile solvent in such a way that the solvent itself is substantially eliminated before contact with the cellulose derivative. Diethyl ether is a very suitable liquid vehicle for application according to this method on account of its high volatility. It is to be noted that spraying with solutions of plasticizer in ether or like liquids wherein the ether or the like is evaporated or removed after application of the plasticizer to the cellulose derivative does not form part of the present invention, which includes only such processes when the ether or like liquid vehicle is substantially eliminated from the spray or mist before contact with the cellulose derivative. This method of treatment is particularly valuable when solid plasticizing agents, such as triphenyl phosphate or diphenylol propane, are to be used, though it is of course equally applicable in the case of liquid plasticizers. In such a method of working the spray or mist of plasticizer and volatile solvent may be formed in a heated atmosphere so as to eliminate the volatile solvent or alternatively the solution may be sprayed at a suitably elevated temperature so as to effect this object. Again the cellulose derivative itself may be warmed or heated during the application of the plasticizer and this modification refers both to spraying with a plasticizer alone or with a volatile solvent.

As already indicated it is preferably to treat the cellulose acetate or other cellulose derivative in the form of thin sheets, thin flakes or in disintegrated or finely powdered form. Sheets, formed for instance from an acetylation or other esterification solution or from any other suitable solution of the cellulose derivative, may be sprayed with a plasticizer on one or both sides and the whole allowed to remain for some time for the plasticizer to be homogeneously incorporated with the cellulose derivative. Again powder may be carried forward progressively under a spray of plasticizer, the carrier device being preferably arranged to rock or shake so as to turn the particles of cellulose derivative during passage through the spray or mist. In working with powders, flakes or with more or less disintegrated forms of cellulose acetate or other cellulose derivative, it is preferable that the size of the particles should be substantially uniform in order to obtain as uniform as possible an impregnation with the plasticizer. For this reason powders may, for example, be graded before applying the process of the present invention.

Preferably in the process of application of plasticizer according to the present invention the cellulose derivative itself is sprayed into or through a spray or mist of the plasticizing agent. Thus for example a spray or shower of finely divided cellulose derivative may be arranged to cross the path of a mist or spray of plasticizing agent, or as an alternative both plasticizing agent and cellulose derivative may be sprayed from a double nozzle, the cellulose derivative for example being sprayed from an internal nozzle and the plasticizer from an annular orifice surrounding the orifice for the cellulose derivative.

During the application of the plasticizer and/or after the application of the plasticizer while the latter is being absorbed, the cellulose derivative may be warmed or heated to enhance its absorptive power.

In all the forms of carrying out the present invention the cellulose derivative over which the plasticizer has been uniformly distributed is preferably allowed to stand for some time, for example for ½ hour to 6 hours or more, so as to absorb the plasticizer homogeneously before being worked up into articles, moulding powders or other required products.

If desired the homogeneity of the product may be still further improved by kneading, preferably with heating, or by melting the mass or at least heating it to a sufficient temperature to induce a considerable softening. The mass after cooling may, if desired, be disintegrated to form moulding powders, if such be the required products. Or alternatively the melted or softened mass may be cast or moulded directly to form films, rods, tubes, slabs, sheets, blocks or other articles.

If desired other additions may be made to the compositions, for example natural or synthetic resins, stabilizers, such as urea or urea derivatives, dyes, pigments, effect materials, filling substances and the like. Such additions may, if feasible, be made together with the plasticizer, particularly in the case of resins, dyestuffs or like additions which may be dissolved in the plasticizer or in the solution of the plasticizer in a volatile solvent.

Again for the production of non-inflammable products suitable non-inflammators may be incorporated in the compositions. For this purpose mineral fillers, such as phosphates and the like may be employed, but I prefer to employ agents which are soluble in the cellulose acetate or other cellulose derivative or compatible therewith, for example halogenated and preferably highly halogenated organic compounds. Of these I may mention the halogenated phenols and aromatic amines and their acidyl derivatives, for example trichlor-methyl acetanilide and tetrachlor-ethyl acetanilide. The best agents to use for this purpose are however the brominated derivatives of aromatic amines and particularly the brominated acidylated aromatic amines of U. S. application S. No. 366100 filed 25th May, 1929, for example 2.4.6-tribrom-diacetanilide. Such halogenated organic compounds may themselves act as plasticizing agents and in fact may be the sole plasticizing agent present, but in general I prefer to employ them in conjunction with sulphonamide or like plasticizers. In order to prevent any deleterious action due to the presence of free halogen or to the liberation of halogen, small quantities of dicyandiamide or other agents capable of readily combining with halogen may be incorporated together with the agents for reducing flammability. With the brominated acidylated aromatic amines previously referred to such a precaution is however in general unnecessary.

While the invention has been described more particularly with reference to cellulose acetate as the cellulose derivative to be employed it may also be applied to the production of moulding powders, plastic or celluloid-like masses or the like having a basis of other cellulose esters, for example cellulose formate, cellulose propionate, cellulose butyrate, or cellulose esters of acids containing a comparatively large number of carbon atoms, as for instance cellulose laurate or cellulose naphthenate, mixed cellulose esters, for example cellulose acetonitrate, or cellulose ethers, for instance methyl, ethyl or benzyl cellulose, or mixed ethers or mixed ether-esters.

What I claim and desire to secure by Letters Patent is:—

1. Process for the production of plasticized cellulose derivatives, which comprises spraying a cellulose derivative with a plasticizing agent so that substantially no volatile substance contacts with the cellulose derivative.

2. Process for the production of plasticized cellulose derivatives, which comprises spraying a cellulose derivative with a liquid plasticizing agent so that substantially no volatile substance contacts with the cellulose derivative.

3. Process for the production of plasticized cellulose derivatives, comprising spraying a cellulose derivative with a plasticizing agent in the substantial absence of a volatile substance.

4. Process for the production of plasticized cellulose derivatives, comprising spraying a cellulose derivative with a liquid plasticizing agent in the substantial absence of a volatile substance.

5. Process for the production of plasticized cellulose derivatives, which comprises directing towards a cellulose derivative a spray containing a plasticizing agent in a liquid vehicle and removing the liquid vehicle prior to contact of the plasticizing agent with the cellulose derivative.

6. Process for the production of plasticized cellulose derivatives, comprising spraying a disintegrated cellulose derivative with a liquid plasticizing agent in the substantial absence of a volatile substance.

7. Process for the production of plasticized cellulose derivatives, which comprises directing towards a disintegrated cellulose derivative a spray containing a plasticizing agent in a liquid vehicle and removing the liquid vehicle prior to contact of the plasticizing agent with the cellulose derivative.

8. Process for the production of plasticized cellulose derivatives, which comprises directing towards a cellulose derivative a spray containing a plasticizing agent in a volatile liquid vehicle and removing the liquid vehicle by volatilization prior to contact of the plasticizing agent with the cellulose derivative.

9. Process for the production of plasticized cellulose derivatives, which comprises directing towards a cellulose derivative a spray containing a plasticizing agent in ether and removing the ether by volatilization prior to contact of the plasticizing agent with the cellulose derivative.

10. Process for the production of plasticized cellulose derivatives, comprising spraying a cellulose derivative with a plasticizing agent in the substantial absence of a volatile liquid and allowing the cellulose derivative and plasticizing agent to stand for some time prior to any working.

11. Process for the production of plasticized cellulose derivatives, comprising spraying a cellulose derivative with a plasticizing agent in the substantial absence of a volatile substance, allowing the cellulose derivative and plasticizer to stand for some time and then working up the cellulose derivative and plasticizer into the desired article.

12. Process for the production of plasticized organic derivatives of cellulose, comprising spraying an organic derivative of cellulose with a plasticizing agent in the substantial absence of a volatile substance and allowing said derivative and plasticizer to stand for at least half an hour prior to any working.

13. Process for the production of plasticized cellulose derivatives, comprising spraying a cellulose derivative with a plasticizing agent in the substantial absence of a volatile substance, and then kneading the plasticizer and cellulose derivative.

14. Process for the production of plasticized cellulose acetate, comprising spraying the cellulose acetate with a liquid plasticizing agent in the substantial absence of a volatile substance.

15. Process for the production of plasticized cellulose acetate, which comprises directing towards cellulose acetate a spray containing a plasticizing agent in a volatile liquid vehicle and removing the liquid vehicle by volatilization prior to contact of the plasticizer with the cellulose acetate.

HENRY DREYFUS.